(12) United States Patent
Odaohhara

(10) Patent No.: US 6,920,575 B2
(45) Date of Patent: Jul. 19, 2005

(54) POWER SOURCE SWITCHING UNIT WITH INTEGRATED CHARGING CIRCUIT FOR SELECTIVELY COUPLING AN EXTERNAL POWER SOURCE, A COMPUTER LOAD, AND BATTERIES, FOR PROVIDING TEMPORARY POWER DURING COUPLING, AND FOR CHARGING BATTERIES

(75) Inventor: Shigefumi Odaohhara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 09/753,585

(22) Filed: Jan. 2, 2001

(65) Prior Publication Data

US 2002/0124192 A1 Sep. 5, 2002

(51) Int. Cl.[7] .............................................. G06F 13/00
(52) U.S. Cl. ........................ 713/340; 713/300; 713/324
(58) Field of Search ................................. 713/300, 330, 713/340; 714/14; 320/160

(56) References Cited

U.S. PATENT DOCUMENTS

| | | | | |
|---|---|---|---|---|
| 5,230,074 A | * | 7/1993 | Canova, Jr. et al. | .......... 714/14 |
| 5,300,874 A | * | 4/1994 | Shimamoto et al. | ........ 320/106 |
| 5,886,424 A | * | 3/1999 | Kim | ............................. 307/64 |
| 5,939,799 A | * | 8/1999 | Weinstein | ...................... 707/64 |
| 6,195,754 B1 | * | 2/2001 | Jardine et al. | .............. 713/324 |
| 6,202,171 B1 | * | 3/2001 | Townsley et al. | .............. 714/14 |

FOREIGN PATENT DOCUMENTS

| | | | | |
|---|---|---|---|---|
| JP | PEUMA 04-28194 | 7/1992 | ............. | H02J/9/06 |
| JP | PUPA 08-079982 | 3/1996 | ............. | H02J/7/34 |
| JP | PUPA 09-308131 | 5/1996 | ............. | H02J/9/06 |

* cited by examiner

*Primary Examiner*—Tim Vo
*Assistant Examiner*—Raymond N Phan
(74) *Attorney, Agent, or Firm*—John Bruce Schelkopf; Dillon & Yudell LLP

(57) ABSTRACT

To obtain a power source switching unit that is capable of cost and size reduction, and also supplying electric power reliably even when external power supply is intercepted, and to obtain a computer that is capable of avoiding shutdown that results from the interception of the external power supply. The power source switching unit is equipped on a power supply line with an AC adapter detection circuit and outputting a #AC-ADAP signal, and a temporary power supply circuit for temporarily supplying electric power to a DC-DC converter when the power supply is intercepted. The switching unit is further equipped with a battery switching circuit for switching the states of FET1, FET2, FET3, and FET4 so that main and second batteries are both connected to the DC-DC converter in response to a change in the #AC-ADAP signal when the AC adapter is disconnected from the switching unit.

21 Claims, 9 Drawing Sheets

POWER SOURCE SWITCHING UNIT WITH INTEGRATED CHARGING CIRCUIT FOR SELECTIVELY COUPLING AN EXTERNAL POWER SOURCE, A COMPUTER LOAD, AND BATTERIES, FOR PROVIDING TEMPORARY POWER DURING COUPLING, AND FOR CHARGING BATTERIES

BACKGROUND OF THE INVENTION

1. Technical Field

The present invention relates to a power source switching unit and a computer, and more particularly to a power source switching unit for switching power paths for a plurality of batteries to be charged with electric power supplied from the outside, and a computer equipped with that power source switching unit.

2. Description of the Related Art

In notebook-sized personal computers (hereinafter referred to as notebook-sized PCs), in order to enhance their portability, it is becoming standard to prepare an AC adapter (AC/DC converter), which converts commercial power to DC power to supply it to the computer main body, separately from the notebook-sized PC, and to install and employ the AC adapter in the notebook-sized PC as needed.

There are many cases where such a notebook-sized PC, because of its excellent portability, is employed where no commercial electric power is obtained. To cope with these cases, etc., some of the notebook-sized PCs are equipped with a plurality of batteries, such as a main battery, a second battery, etc., in which DC power obtained by the above-mentioned AC adapter is charged. When no AC adapter is installed, DC power is supplied by employing any one of the above-mentioned plurality of batteries.

In this kind of notebook-sized PC, in charging the above-mentioned plurality of batteries, rapid charging is generally performed until the batteries are fully charged, after trickle charging has been performed until battery voltage reaches a constant value. In trickle charging, a small amount of charging is performed so that a battery is not damaged, and during trickle charging, the capacity of a battery is near 0 (zero). Therefore, a battery that is executing trickle charging cannot supply the electric power required for operating the system.

FIG. 8 shows an example of a power-source switching unit for a notebook-sized PC, equipped with two batteries. As shown in the same figure, this power-source switching unit is equipped with a first series circuit 100 provided between a power-supply line L and a main battery 64A, and a second series circuit 102 provided between the power-supply line L and a second battery 64B. The power-supply line L leads from an AC adapter 62 to a DC-DC converter 66 in which an input DC voltage is converted to a predetermined voltage to be employed in each part of the notebook-sized PC.

The first series circuit 100 is equipped with a field effect transistor 1 (hereinafter referred to as a FET1) and a FET2. The second series circuit 102, as with the first series circuit 100, is equipped with a FET3 and a FET4.

The FET1 and the FET3 have body diodes D1 and D3 wherein the cathode is connected to a drain D and also the anode is connected to a source S. The FET2 and FET4 have body diodes D2 and D4 in which the cathode is connected to a source S and also the anode is connected to a drain D.

On the other hand, a trickle charging circuit 140A is provided between the power-supply line L and the source S of the FET1, and a trickle charging circuit 140B is provided between the power-supply line L and the source S of the FET3. A rapid charging circuit 142 is provided between the power-supply line L and the drain D of the FET2. Note that the drains D of the FET2 and the FET4 are connected with each other. Also, between this point of connection and the power-supply line L, a FET5 is provided for preventing the short circuit of a rapid charging circuit 142 which is performing rapid charging. That is, the FET5 is switched off when the main battery 64A or second battery 64B is rapidly charged by the rapid charging circuit 142, and is switched on, when the main battery 64A or second battery 64B is trickle charged by the trickle charging circuit 140A or 140B, or when DC power is supplied from either the main battery 64A or the second battery 64B to the DC-DC converter 66.

In the power-source switching unit constructed as described supra, in the case where the system is in operation, and the AC adapter 62, the main battery 64A in a full charged state, and the second battery 64B in an empty state have been installed, the trickle charging circuit 140B performs trickle charging on the second battery 64B. When this occurs, the FET1 and the EFT3 are both off, the FET2 and the FET4 are both on, and furthermore, the FET 5 is on.

Therefore, in the case where in this state the electric power supplied from the outside is intercepted by disconnection of the AC adapter 62 from the system, DC power is to be supplied from the main battery 64A, through the body diode D1 of the FET1, the FET2, and the FET 5 in sequence, and to the DC-DC converter 66.

However, in the case where the power-source switching unit is equipped with both the trickle charging circuit and the rapid charging circuit, as shown in FIG. 8, there is a problem that the power-source switching unit will be increased in cost and difficult to reduce in size.

To overcome this problem, it is considered that a trickle charging circuit and a rapid charging circuit are constructed and employed as a single charging circuit (hereinafter referred to as an "integrated charging circuit"). However, this case has the following functional problems.

FIG. 9 shows an example of a power-source switching unit equipped with an integrated charging circuit. This power-source switching unit differs from that shown in FIG. 8, in that the trickle charging circuit is omitted and that the rapid charging circuit is replaced with an integrated charging circuit 144. Note that the power-source switching unit shown in the same figure is constructed such that a power management controller (hereinafter referred to as a "PMC") 104 controls the switched states of the FET1, the FET2, the FET3, the FET4, and the FET5 through the FET driving circuits.

FIG. 10 shows an example of the charging characteristic of the above-mentioned integrated charging circuit 144 in the case where batteries to be charged are constructed by connecting 3 (three) lithium ion batteries of rated voltage 4.2 V in series. As shown in the same figure, after trickle charging has been performed with a charging current value of 0.3 A until the charging voltage reaches 9.0 V (3.0 V per lithium ion battery), rapid charging is performed with a charging current value of 2.8 A until the charging voltage reaches a full charging voltage (12.6 V).

In the power-source switching unit constructed as described supra, in the case where the system is in operation, and the AC adapter 62, the main battery 64A in a full charged state, and the second battery 64B in an empty state have been installed, the AC adapter 62 supplies electric power to the DC-DC converter 66, and the integrated charging circuit 144 performs trickle charging on the second battery 64B by the electric power supplied from the AC adapter 62. When this occurs, the FET3 and the EFT4 are both on in order to charge the second battery 64B, and the FET1 and the FET2 are both off in order to prevent a short circuit between the main battery 64A and the second battery 64B. In addition, the FET5 is off in order to prevent the short circuit of the integrated charging circuit 144.

In the case where in this state the electric power supplied from the outside is intercepted by disconnection of the AC adapter 62 from the system, the FET1 and the FET2 are both off and therefore the main battery 64A is disconnected from the system. Because of this, the supply of DC power from the main battery 64A to the DC-DC converter 66 cannot be performed. Therefore, in this case, the system will be shut down.

The present invention has been made in order to overcome the above-mentioned problems. Accordingly, it is an object of the present invention to obtain a power-source switching unit which is capable of cost reduction and size reduction and also supplying electric power reliably even when external power supply is intercepted. Another object of the present invention is to obtain a computer that is capable of avoiding shutdown which results from the interception of external power supply.

SUMMARY OF THE INVENTION

A power-source switching unit according to the present invention is equipped with an external power circuit for supplying electric power from an external power source to computer loads. Here, the external power source can include a DC power source to be supplied to a computer by an AC adapter, an AC power source to be supplied to an AC adapter incorporated computer, and a DC power source to be supplied directly to a computer. The external power circuit supplies these external power sources to both computer loads and a charging device directly, or after voltage conversion, stabilization, etc., have been performed. A detector detects loss of the electric power supplied from the external power circuit. This also includes loss of an external power source or the case where the voltage across the external power circuit is out of a predetermined value because of a defect, etc., in the external power circuit.

The power-source switching unit is further equipped with a plurality of battery-power supply circuits, a charging device, a switching device, and a temporary power-supply device. This unit performs battery charging, while supplying electric power to computer loads. When the charging device performs battery charging by taking advantage of electric power supplied from an external power source, the electric power from the external power source is also supplied to computer loads so that the computer can operate. If, at this time, the electric power from the external power circuit is lost from one cause or another, the detector detects this state and the switching device operates so that it supplies electric power from at least one of the battery-power supply circuits to the computer loads in response to the detector.

The operation between the time that the switching device operates and the time that the supply of electric power to computer loads is switched from the supply of electric power from the external power circuit to the supply of electric power from batteries is executed within a predetermined time. The temporary power-supply device maintains the supply of electric power to computer loads for at least a predetermined time in response to the operation of the detector. Therefore, even if electric power from the external power source is lost during battery charging, and even if the supply of the external electric power to computer loads is stopped, power supply is continued for at least the predetermined time by the temporary power-supply device, and furthermore, after the predetermined time, the power supply is continued by at least one battery.

Thus, in the present invention, in the case where external power supply is intercepted in charging at least one of a plurality of batteries, electric power is supplied from at least one battery to computer loads when electric power is being supplied to the computer loads by the temporary power-supply device. Therefore, the power-source switching unit according to the present invention does not need to be equipped with both a trickle charging circuit and a rapid charging circuit. Thus, the power-source switching unit is capable of cost reduction and size reduction and reliably continuing the supply of electric power to computer loads even when external power supply is intercepted.

In the case where the power-source switching unit according to the present invention is applied to a power-source switching unit having an integrated charging circuit described as an example with reference to FIG. 9, the above-mentioned switching device can be constructed so that it includes a plurality of switches (corresponding to a first series circuit 100 and a second series circuit 102 in FIG. 9) provided between the above-mentioned batteries and computer loads. The switches are switched on when a corresponding battery is charged or when electric power is supplied from the corresponding battery to the computer, and are switched off when the corresponding battery is not charged. This can be achieved by switching on either at least a switch corresponding to a battery capable of supplying electric power, or by switching on all the above-mentioned switches by the above-mentioned switching device. Note that in the example shown in FIG. 9, switching on only the FET2 and the FET4 is preferable to switching on the FET1, the FET2, the FET3, and the FET4, because circulating current can be prevented from flowing between batteries when there is a large difference in electric potential between the batteries.

In this case, switching can be performed from the external power circuit to the above-mentioned battery-power supply circuit by employing a switch that has been provided in the power-source switching unit. Therefore, the power-source switching unit can be constructed at low costs and in small size.

In addition, the battery-power supply circuit in the present invention, which supplies electric power to computer loads after electric power from the external power circuit has been intercepted, can be constructed such that electric power is supplied from a fixed battery, which is capable of supplying electric power independent of external electric power, to the computer. Therefore, even when the aforementioned plurality of batteries are all in an empty state, the supply of electric power to the computer can be continued with reliability. Furthermore, the computer according to the present invention is equipped with the power-source switching unit of the present invention and computer loads which perform a predetermined operation with power on.

Therefore, according to the computer of the present invention, in the case where external power supply is intercepted in charging at least one of a plurality of batteries, electric power is supplied from at least one battery to computer loads when electric power is being supplied to the computer loads by the temporary power-supply device. Therefore, the computer according to the present invention does not need to be equipped with both a trickle charging circuit and a rapid charging circuit. Thus, the computer is capable of cost reduction and size reduction and reliably continuing the supply of electric power to computer loads even when external power supply is intercepted. Therefore, shutdown resulting from the interception of external power supply can be avoided.

Note that the above-mentioned temporary power-supply device can employ a capacitor, or a battery, etc., which differ from the plurality of batteries of the present invention.

DETAILED DESCRIPTION OF THE PREFERRED EMBODIMENT

Figure 1:
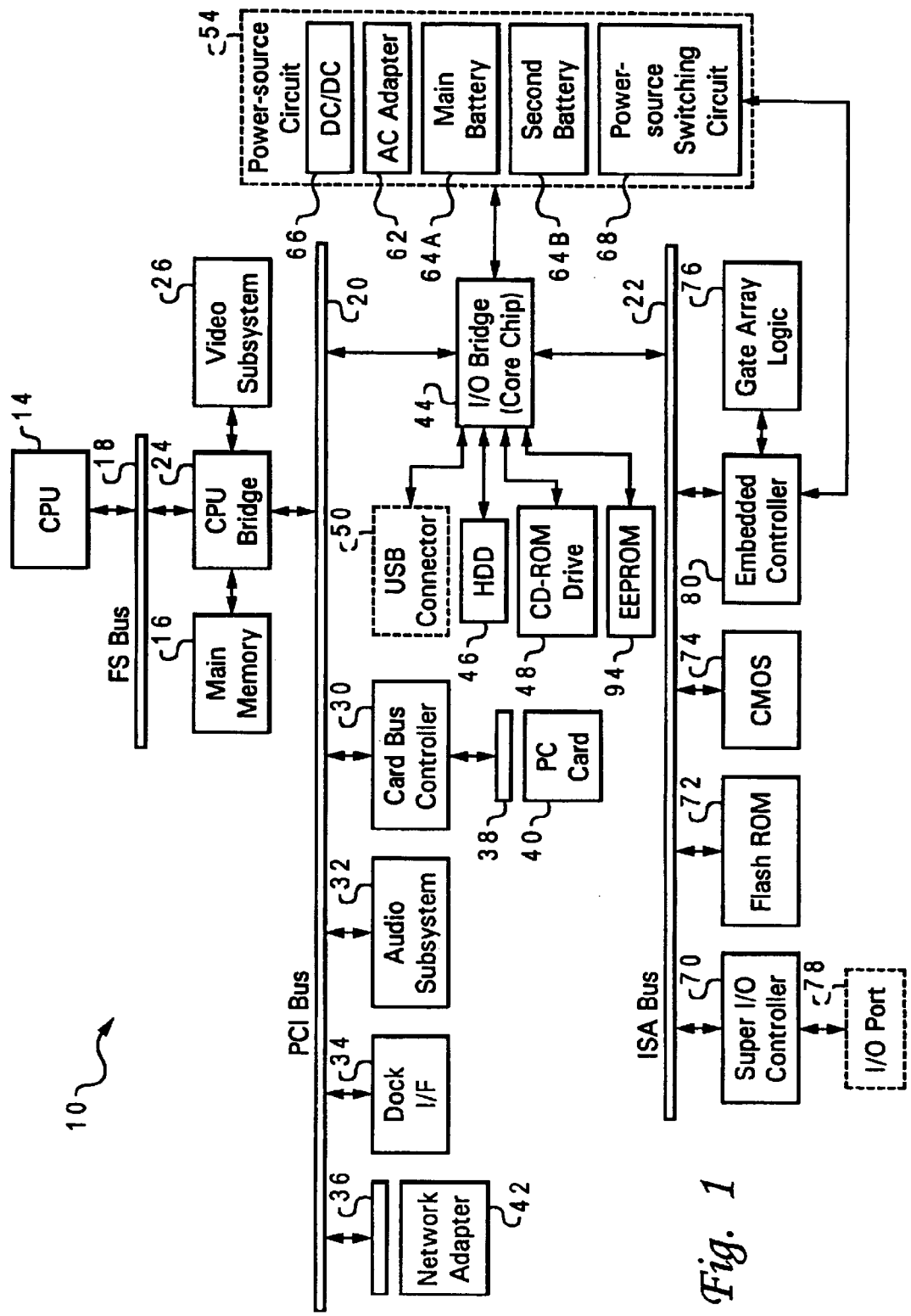
FIG. 1 is a block diagram showing a computer system constructed according to an embodiment of the present invention.
Figure 2:
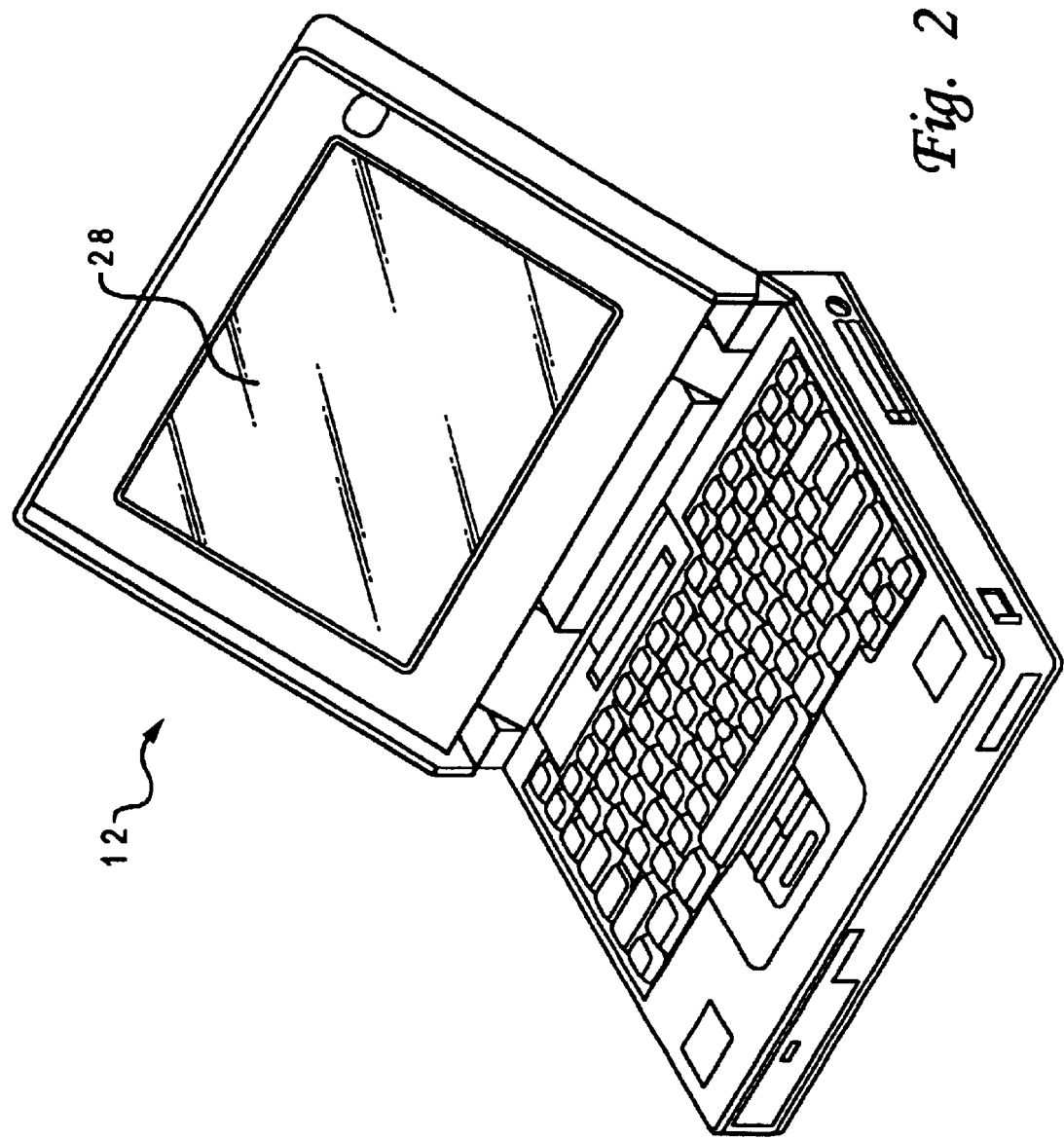
FIG. 2 is a perspective view showing a notebook-sized personal computer.

An embodiment of the present invention will be described in detail with reference to the drawings. In FIG. 1 the hardware construction of a computer system 10 consisting of a typical personal computer (PC) equipped with a power-source switching unit according to the present invention is shown for each subsystem. As an example of the PC to which the present invention is applied, there is a notebook-sized PC 12 (see FIG. 2), which is based upon the Open Architecture Developer's Group (OADG) standard and has "Windows 98 or NT (Microsoft)" or "OS/2 (IBM)" as an operating system (OS). Each part of the computer system 10 will hereinafter be described in detail.

A central processing unit (CPU) 14, which is the entire brain of the computer system 10, executes various programs under control that is performed by the OS. The CPU 14 may be, for example, Pentium, MMX Technology Pentium, and Pentium Pro produced by Intel. It may also be CPUs produced by AMD, etc. Furthermore, it may be PowerPC produced by IBM. The CPU 14 is constructed such that it includes an L2 (level 2)-cache which is a high-speed operating memory for shortening the total time to access a main memory 16 by temporarily storing extremely limited code and data that are frequently accessed. The L2-cache is generally constructed with a static random access memory (SRAM) chip, the storage capacity of which is, for example, 512 kB or more.

The CPU 14 is interconnected with each hardware element to be described later, through three level buses, a front side (FS) bus 18 as a process direct bus connected directly to the external pin of the CPU 14, a peripheral component interconnect (PCI) bus 20 as a high-speed I/O device bus, and an industry standard architecture (ISA) bus 22 as a low-speed I/O device bus.

The FS bus 18 and the PCI bus 20 are connected by a CPU bridge (host-PCI bridge) 24 generally called a memory/PCI control chip. The CPU bridge 24 of this embodiment includes a memory controller function for controlling an operation of accessing the main memory 16, a data buffer for absorbing a difference in data transfer speed between the FS bus 18 and the PCI bus 20, etc. For example, 440BX (Intel), etc., can be employed.

The main memory 16 is writable memory that is utilized as a region in which execution programs to be carried out by the CPU 14 are read, or as a working region to which the data of the execution programs is written. The main memory 16 is generally constructed with a plurality of dynamic RAM (DRAM) chips. It normally has 32 Mbytes and can be extended up to 256 Mbytes. To meet the high-speeding requirement, the DRAM has recently been switched to a high-speed page DRAM, an EDO DRAM, a synchronous DRAM (SDRAM), a burst EDO DRAM, RDRAM, etc.

Note that the execution program used herein includes an OS, such as Windows 98, etc., various device drivers for controlling peripheral equipment for hardware operation, application programs directed to specific operations, and firmware, such as a basic input/output system (BIOS) (which is a program for controlling input-output of hardware such as a keyboard, a floppy disk drive, etc.) stored in a flash ROM 72, etc.

The PCI bus 20 is a type of bus capable of relatively high-speed data transfer (e.g., bus width 32/64 bits, maximum operating frequency 33/66/100 MHZ, and maximum data transfer speed 132/264 Mbits/s). PCI devices, which operate at relatively high speeds, such as a card bus controller 30, are connected to the PCI bus 20. Note that the PCI architecture has been proposed by Intel and realized a plug-and-play (PnP) function.

A video subsystem 26 is a subsystem for realizing video-related functions and includes a video controller, which actually processes a picture-drawing instruction from the CPU 14, temporarily writes the processed picture-drawing information to a video RAM, and reads out the picture-drawing information from the video RAM and outputs it to a liquid crystal display (LCD) 28 (see FIG. 2) as picture-drawing data. The video controller can convert a digital video signal to an analog video signal by a digital-to-analog converter (DAC) attached thereto. The analog video signal is output to a CRT port (not shown) through a signal line.

The card bus controller 30, an audio subsystem 32, a docking station interface (Dock-I/F) 34, and a mini-PCI slot 36 are connected to the PCI bus 20. The card bus controller 30 is a dedicated controller for connecting a bus signal on the PCI bus 20 directly to the interface connector (card bus) of a PCI card bus slot 38. The card bus slot 38 is equipped with a PC card 40, for example, installed on the wall of the main body of the PC 12 and shoved therein. The PC card 40 is based upon the standard (e.g., PC Card Standard 95) proposed by Personal Computer Memory Association (PCMCIA)/Japan Electronic Industry Development Association (JEIDA).

The Dock-I/F 34 is hardware for connecting the PC 12 and a docking station (not shown). If the PC 12 is set to the docking station, the internal bus of the docking station is connected to the Dock-I/F 34 and therefore various devices connected to the internal bus of the docking station are connected to the PCI bus 20 through the Dock-I/F 34. Connected to the mini-PCI slot 36 is, for example, a network adapter 42 for connecting the computer system 10 to a network (e.g., a local area network (LAN)).

The PCI bus 20 and the ISA bus 22 are interconnected by an I/O bridge 44. The I/O bridge 44 is equipped with a bridging function between the PCI bus 20 and the ISA bus 22, a DMA controller function, a programmable interrupt controller (PIC) function, a programmable interval timer (PIT) function, an integrated drive electronics (IDE) interface function, a universal serial bus (USB) function, and a system management bus (SMB) interface function, and incorporates a real time clock (RTC). For instance, a device (core chip) called PIIX4 (Intel) can be employed.

Note that the DMA controller function is a function for executing data transfer between peripheral equipment (e.g., a floppy disk drive (FDD)) and the main memory 16 without intervention of the CPU 14. Also, the PIC function is a function for executing a predetermined program (interrupt handler) in response to an interrupt request (IRQ) from peripheral equipment. Furthermore, the PIT function is a function for generating a timer signal at predetermined cycles. The cycle is programmable.

An IDE CD-ROM drive 48, in addition to an IDE hard disk drive (HDD) 46, is connected to an IDE interface realized by the IDE interface function through an AT attachment packet interface (ATAPI). Instead of the IDE CD-ROM drive 48, another type of IDE device, such as a digital video disk or digital versatile disk (DVD) drive, may be connected. External storage drives, such the HDD 46, the CD-ROM drive 48, etc., are stored, for example, in a housing place within the main body of the PC 12, called a media bay or device bay. In some cases, these external storage drives equipped as standard in the PC 12 are attached interchangeably with and exclusively from other devices such as a FDD, a battery pack, etc.

The I/O bridge 44 is provided with a USB port. This UBS port is connected, for example, to a USB connector 50, provided on the wall of the main body of the PC 12, etc. The USB port supports a function of taking out and plugging in new peripheral equipment (USB device) with power on (hot plugging function) and a function of automatically recognizing new peripheral equipment connected and resetting system configuration (plug-and-play function). For a single USB port, a maximum of 63 (sixty-three) USB devices can be connected in daisy-chain form. Examples of USB devices are a keyboard, a mouse, a joy stick, a scanner, a printer, a modem, a display monitor, a tablet, etc.

The I/O bridge 44 is also connected with an electrically erasable programmable read-only memory (EEPROM) 94 through a SM bus. The EEPROM 94 is memory for holding information such as a password registered by the user, a supervisor password, a produce serial number, etc. The EEPROM 94 is nonvolatile and able to electrically rewrite stored contents.

The I/O bridge 44 is further connected to a power-source circuit 54. The power-source circuit 54 is equipped with an AC adapter 62, a power-source switching circuit 68 for charging a main battery 64A or a second battery 64B and also switching a power-supply path from the AC adapter 62 or each battery, a DC/DC converter 66 for generating DC direct fixed voltages of 5 V, 3.3 V, etc., which is used in the computer system 10, etc. The power-source switching circuit 68 corresponds to the power-source switching unit of the present invention and the AC adapter 62 to the external power circuit of the present invention. Note that the main battery 64A and the second battery 64B are constructed by connecting 3 (three) lithium ion batteries of rated voltage 4.2 V in series.

On the other hand, within the core chip constituting the I/O bridge 44, an internal register for managing the power-source state of the computer system 10, and a logic (state machine) for performing management of the power-source state of the computer system 10 as well as manipulation of the internal register, are provided.

The above-mentioned logic transmits and receives various signals between it and the power-source circuit 54, thereby recognizing the actual electric power supplied state between the power-source circuit 54 and the computer system 10. In response to an instruction from the above-mentioned logic, the power-source circuit 54 controls the supply of electric power to the computer system 10.

The ISA bus 22 is a bus lower in data transfer speed than the PCI bus 20 (e.g., bus width 16 bits and maximum data transfer speed 4 Mbits/s) and is used to connect peripheral equipment (not shown), which operates at a relatively low speed, such as a keyboard and a mouse controller, in addition to a super I/O controller 70, a flash ROM 72 consisting of an EEPROM, etc., a complementary metal-oxide semiconductor (CMOS) 74, and an embedded controller 80 connected to a gate array logic 76.

The super I/O controller 70 is connected with an I/O port 78. The super I/O controller 70 controls driving of a floppy disk drive (FDD), input-output of parallel data (PIO) through a parallel port, and input-output of serial data (SIO) through a serial port.

The flash ROM 72 is memory for holding a program such as a BIOS, etc. It is nonvolatile and able to electrically rewrite stored contents. The CMOS 74 is constructed such that a nonvolatile semiconductor memory is connected to a back-up power source. The SMOS 74 functions as a nonvolatile and high-speed storage means.

The embedded controller 80 controls a keyboard (not shown) and also performs part of the power management function in cooperation with the gate array logic 76 by an incorporated power management controller (hereinafter referred to as a PMC) 82 (see FIG. 3). Note that the PMC 82 in this embodiment has a function of sensing the capacity (a DC power value that can be output at that point of time) of the main battery 64A or second battery 64B. The PMC 82 corresponds to the switching control device of the present invention.

Figure 3:
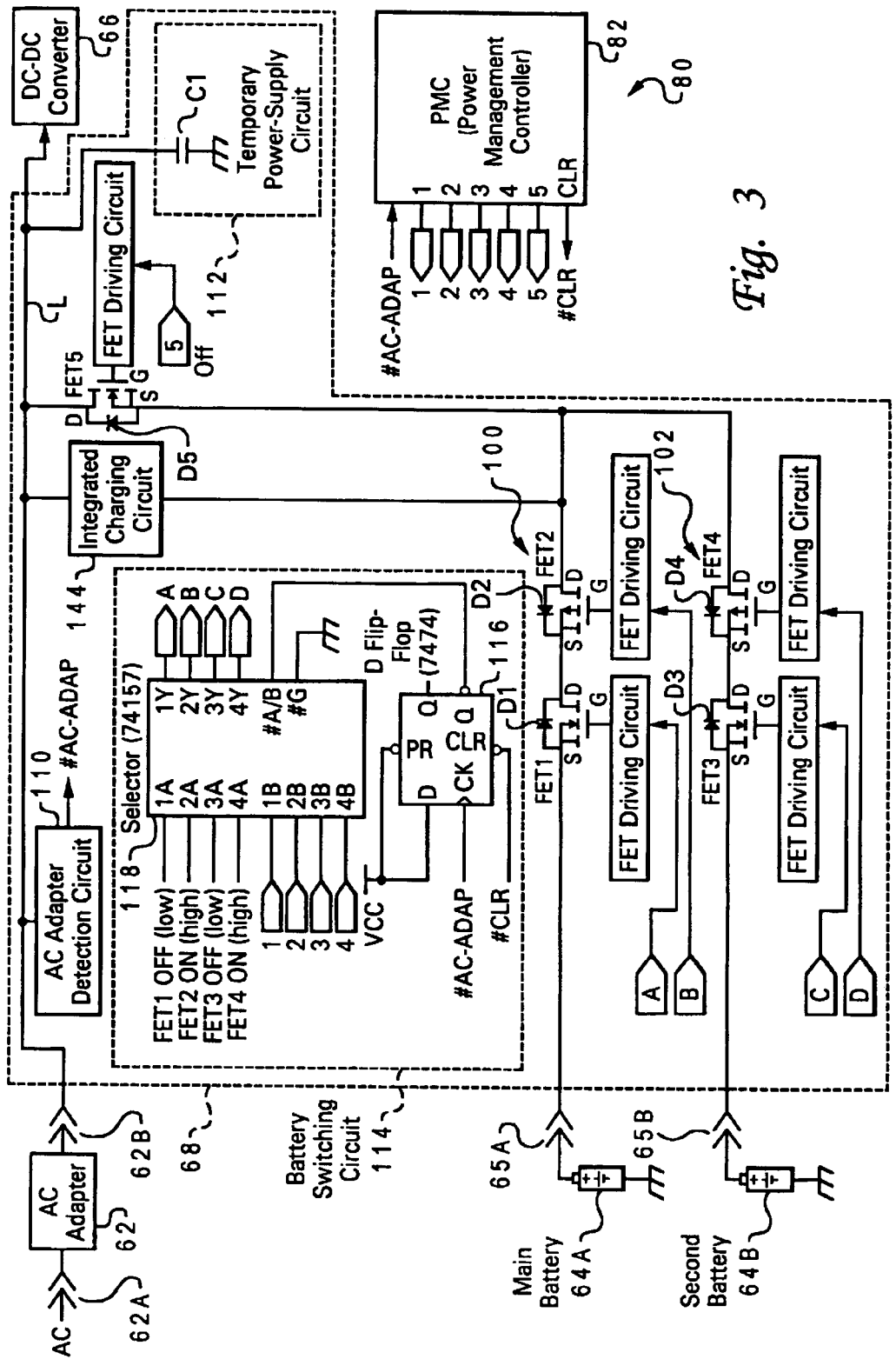
FIG. 3 is a block diagram (partially circuit diagram) showing a power-source switching circuit constructed according to the embodiment.

FIG. 3 shows an example of the internal construction of the above-mentioned power-source switching circuit 68. As shown in the same figure, the power-source switching circuit 68 is equipped with a first series circuit 100 provided between a power-supply line L and the main battery 64A, and a second series circuit 102 provided between the power-supply line L and the second battery 64B. The power-supply line L leads from the AC adapter 62, connected to both an input terminal 62A (connected with an alternating current power source AC which serves as an external power source) and an output terminal 62B (connected with the DC-DC converter 66), to the DC-DC converter 66. Note that the PC 12 in this embodiment is provided with a battery pack housing portion (not shown), wherein the above-mentioned main battery 64A and second battery 64B are detachably installed. In the installed state, the main battery 64A and the second battery 64B are connected to the first series circuit 100 and the second series circuit 102 through the input terminals 65a and 65B. A first circuit, which leads from the input terminal 65A to the DC-DC converter 66, for supplying electric power from the main battery 64A to the DC-DC converter 66, and a second circuit, which leads from the input terminal 65B to the DC-DC converter 66, for supplying electric power from the second battery 64B to the DC-DC converter 66, correspond to the battery-power supply circuit of the present invention.

The first series circuit 100 is equipped with a field effect transistor 1 (hereinafter referred to as a FET1) and a FET2 wherein the cathodes of the body diodes are connected with each other. The FET can employ a power MOSFET. The second series circuit 102, as with the first series circuit 100, is equipped with a FET3 and a FET4 wherein the cathodes of the body diodes are connected with each other.

The FET1 and the FET3 have body diodes D1 and D3 wherein the cathode is connected to a drain D and also the anode is connected to a source S. The FET2 and FET4 have body diodes D2 and D4 in which the cathode is connected to a source S and also the anode is connected to a drain D. Note that both the first series circuit 100 and the second series circuit 102 correspond to the switch and the first switch of the present invention.

On the other hand, an integrated charging circuit 144 having a rapid charging function and a trickle charging function is provided between the power-supply line L and the drain D of the FET2. Note that the drains D of the FET2 and the FET4 are connected with each other. Also, between this point of connection and the power-supply line L, a FET5 is provided for preventing the short circuit of the integrated charging circuit 144 that is charging either the main battery 64A or the second battery 64B. That is, the FET5 is switched off when the main battery 64A or second battery 64B is charged by the integrated charging circuit 144, and is switched on when DC power is supplied from either the main battery 64A or the second battery 64B to the DC-DC converter 66. Note that the FET5 has an body diode D5 in which the cathode is connected to a drain D and also the anode is connected to a source S. The FET5 corresponds to the second switch of the present invention and the integrated charging circuit 144 to the charging device of the present invention.

To prevent a short circuit between the main battery 64A and the second battery 64B, the FET1 and the FET2 are switched on and also the FET3 and the FET4 are switched off, when the main battery 64A is charged by the integrated charging circuit 144. Also, the FET1 and the FET2 are switched off and also the FET3 and the FET4 are switched on, when the second battery 64B is charged by the integrated charging circuit 144.

The gates G of the FET1, the FET2, the FET3, the FET4 and the FET5 are connected with the output terminals of separate FET driving circuits, respectively. Each FET driving circuit has a function of switching on the FET connected to the output terminal when an input signal is high and also switching off the FET connected to the output terminal when the input signal is low.

The power-source switching circuit 68 is equipped on the power-supply line L with an AC adapter detection circuit 110 and a temporary power-supply circuit 112.

Figure 4:
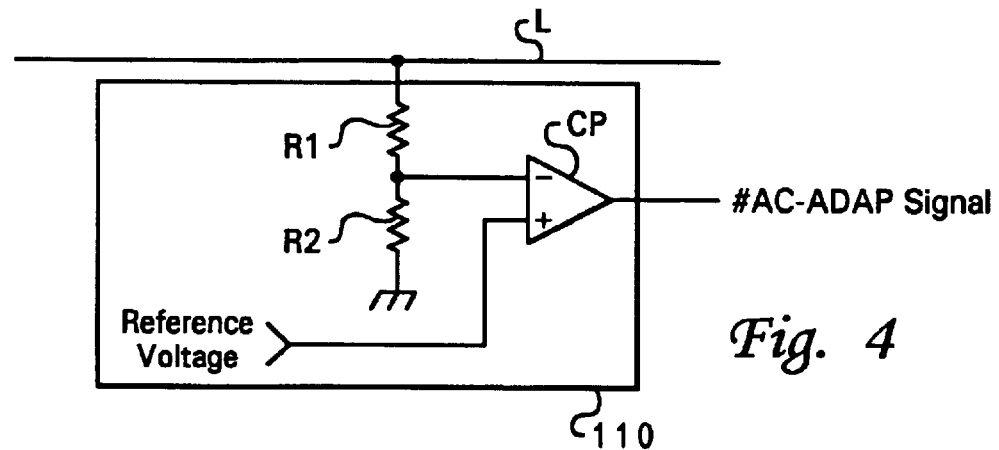
FIG. 4 is a circuit diagram showing an AC adapter detection circuit constructed according to the embodiment.

The AC adapter detection circuit 110, as shown in FIG. 4, is constructed so that it includes a voltage dividing resistor and a comparator CP. The voltage dividing resistor is constructed of resistors R1, R2 and is connected to the power-supply line L. The comparator CP has a negative (−) input terminals connected to the point of connection between the resistors R1 and R2 and a positive (+) input terminal to which a predetermined reference voltage is applied. The comparator CP outputs a #AC-ADAP signal from its output terminal. The #AC-ADAP signal goes to a high level voltage when a voltage on the power-supply line L, divided according to the ratio of resistance values between the resistor R1 and the resistor R2, is less than the above-mentioned reference voltage, and goes to a low level voltage when the above-mentioned voltage on the above-mentioned divided voltage on the power-supply line L is the above-mentioned reference voltage or greater. Note that the ratio of resistance values between the resistor R1 and the resistor R2 in this embodiment has been preset so that #AC-ADAP signal goes to a low level when the AC adapter 62 is installed in the PC 12 and goes to a high level when the AC adapter 62 is not installed in the PC 12.

That is, the AC adapter detection circuit 110 detects interception of electric power supplied from the outside through the AC adapter 62, and corresponds to the detector of the present invention.

The temporary power-supply circuit 112, as shown in FIG. 3, is constructed to include a capacitor C1 having a predetermined capacity (in this embodiment 47 mF). With this capacitor C1, the temporary power-supply circuit 112 can supply DC power to the DC-DC converter 66 only for only a predetermined period (on the order of a microsecond) when the AC adapter 62 is disconnected from the PC 12, i.e., when electric power supplied from the outside through the AC adapter 62 is intercepted. Accordingly, the temporary power-supply circuit 112 functions as the temporary power-supply device of the present invention.

The power-source switching circuit 68 is further provided with a battery switching circuit 114, which serves as a switching device having a function of switching a power-supply path so that the main battery 64A and the second battery 64B are both connected to the DC-DC converter 66, when power supplied through the AC adapter 62 is intercepted. The battery switching circuit 114 is constructed to include a D flip-flop 116 and a selector 118.

The D input terminal and preset (PR) input terminal of the D flip-flop 116 are held at a high level. The clock (CK) input terminal is connected to the output terminal of the comparator CP of the AC adapter detection circuit 110, whereby the #CLR signal is input. The clear (CLR) input terminal is connected to the clear output terminal of the PMC 82, whereby the CLR signal is input. Furthermore, the Q' output terminal of the D flip-flop 116 is connected to a select (#A/B) input terminal of the selector 118. For reference, a truth table for the D flip-flop 116 in this embodiment is listed in Table 1.

TABLE 1

| CLR | PR | D | CK | Q | Q' | Function |
|-----|----|----|-----|----|----|----------|
| L | H | x | x | L | H | Cleared |
| H | L | x | x | H | L | Preset |
| L | L | x | x | H | H | — |
| H | H | L | ↑ | L | H | — |
| H | H | H | ↑ | H | L | — |
| H | H | x | ↓ | Qn | Qn' | No change |

:Don't care; −: Leading edge; ⁻: Trailing edge

The selector 118 is constructed as a so-called 2-channel multiplexer equipped with a 4-bit A input terminal (1A, 2A, 3A, 4A) and a 4-bit B input terminal (1B, 2B, 3B, 4B). When the #A/B input terminal is low with a strobe (#G) terminal being low, signals being input to the A input terminal are output to a Y output terminal (1Y, 2Y, 3Y, 4Y). Also, when the #A/B input terminal is high, signals being input to the B input terminal are output to the Y output terminal.

The 4-bit A input terminal (1A, 2A, 3A, 4A) of the selector 118 is held at a low level, a high level, a low level, and a high level. The B input terminal (1B, 2B, 3B, 4B) is connected with the output terminals 1, 2, 3, and 4 of the PMC 82. Furthermore, the Y output terminal (1Y, 2Y, 3Y, 4Y) is connected with the input terminals of the FET driving circuits wherein the outputs are connected with the FET1, the FET2, the FET3, and the FET4.

The input terminal of the FET driving circuit connected at its output terminal with the FET5 is connected to the output terminal 5 of the PMC 82. The input terminal of the PMC 82 is connected with the output terminal of the comparator CP of the AC adapter detection circuit 110 so that the #AC-ADAP signal can be input.

Note that the computer system 10 is provided with many other electric circuits in addition to the circuits shown in FIG. 1. However, since these are well known to those having skill in this field and do not constitute the subject matter of the present invention, their description is omitted in this specification. In addition, some of connections between hardware blocks in the drawings are also omitted for clarity.

Now, the operation of the power-source switching circuit 68 will be described as the operation of this embodiment.

When it is started, the PMC 82 controls the battery switching circuit 114 so that signals A, B, C, and D, which are output from the Y output terminal of the selector 118 of the battery switching circuit 114 to the FET driving circuits corresponding to the FET1, the FET2, the FET3, and the FET4, coincide with signals output from the output terminals 1, 2, 3, and 4 of the PMC 82.

More specifically, the PR input terminal of the D flip-flop 116 has been maintained at a high level. Therefore, by making the #CLR signal low only for a predetermined period, the Q' output terminal of the D flip-flop 116 can be made high, as also clear from the truth table in Table 1. Therefore, the #A/B input terminal of the selector 118 goes to a high level, and signals input to the B input terminal are output from the Y output terminal of the selector 118. With this, the PMC 82 can perform the ON-OFF control of the FET1, the FET2, the FET3, and the FET4 during normal operation (in a state where the AC adapter 62 is mounted in the PC 12).

When trickle charging the main battery 64A, the output signals 1, 2, 3, 4, and 5 of the PMC 82 are made high, high, low, low and low, whereby the FET1, the FET2, the FET3, and the FET4 are made on, on, off, and off through the battery switching circuit 114 and the FET driving circuit, and also the FET5 is made off only through the FET driving circuit. With this, a short circuit between the main battery 64A and the second battery 64B is prevented and also the integrated charging circuit 144 is prevented from short-circuiting, and trickle charging is performed on the main battery 64A by the integrated charging circuit 144. In addition, power is supplied to the DC-DC converter 66 by the AC adapter 62.

In trickle charging the second battery 64B, the output signals 1, 2, 3, 4, and 5 of the PMC 82 are made low, low, high, high, and low, whereby the FET1, the FET2, the FET3, and the FET4 are made off, off, on, and on through the battery switching circuit 114 and the FET driving circuit, and also the FET5 is made off only through the FET driving circuit. With this, a short circuit between the main battery 64A and the second battery 64B is prevented and also the integrated charging circuit 144 is prevented from short-circuiting, and trickle charging is performed on the second battery 64B by the integrated charging circuit 144. In addition, electric power is supplied to the DC-DC converter 66 by the AC adapter 62.

Figure 5:
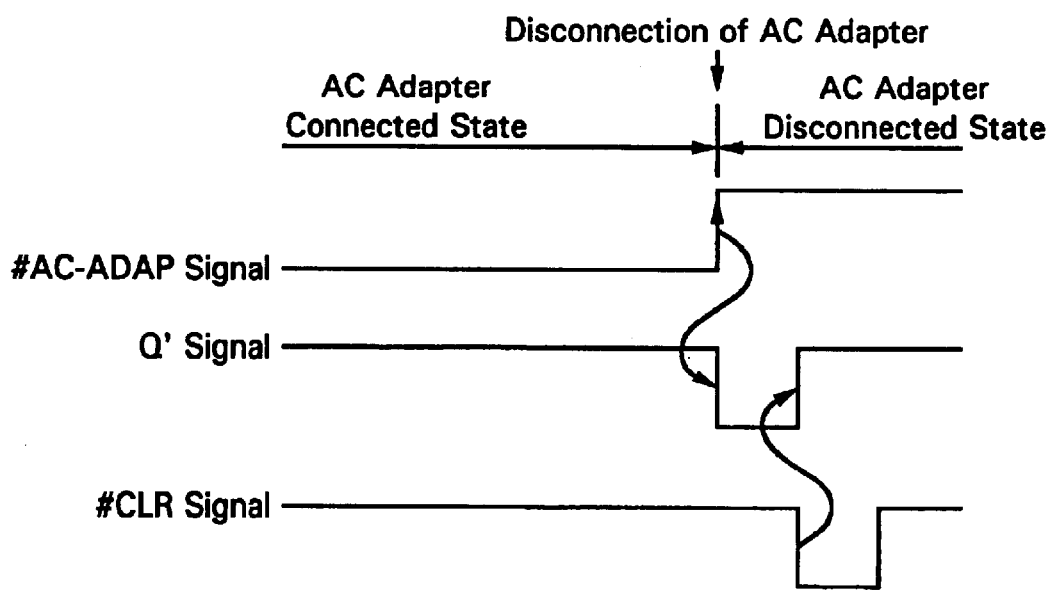
FIG. 5 is a time chart used to explain the operation of the power-source switching circuit according to the embodiment.

In the case where the AC adapter 62 is disconnected from the PC 12 when trickle charging is being performed, the #AC-ADAP signal changes from a low level to a high level, as shown in FIG. 5. Here, as the D input terminal of the D flip-flop 116 has been maintained at a high level, and the #CLR signal input to the CLR input terminal is high, the Q' output terminal of the D flip-flop 116 changes to a low level in synchronization with the leading edge of the #AC-ADAP signal, as also clear from the truth table in Table 1.

Since the #A/B input terminal of the selector 118 goes to a low level, the Y output terminal of the selector 118 is made the same as the state of the A input terminal. That is, the states of the Y output terminal are made 1Y=low level, 2Y=high level, 3Y=low level, and 4Y=high level.

With this operation, the FET1 is switched off, the FET2 on, the FET3 off, and the FET4 on. Also, the main battery 64A and the DC-DC converter 66 are connected through the body diode D1 of the FET1, the FET2, and the body diode D5 of the FET5. The second battery 64B and the DC-DC converter 66 are connected through the body diode D3 of the FET3, the FET4, and the body diode D5 of the FET5. Therefore, when at least either the main battery 64A or the second battery 64B has a capacity capable of supplying DC power to the DC-DC converter 66, DC power can be applied to the DC-DC converter 66. Since the operation of switching the FET1, the FET2, the FET3, and the FET4 is instantaneously performed by the hardware contained in the battery switching circuit 114 within a period during which DC power can be supplied to the DC-DC converter 66 by the temporary power-supply circuit 112 without intervention of the PMC 82, there is no possibility that the supply of DC power to the DC-DC converter 66 will be stopped.

Figure 6:
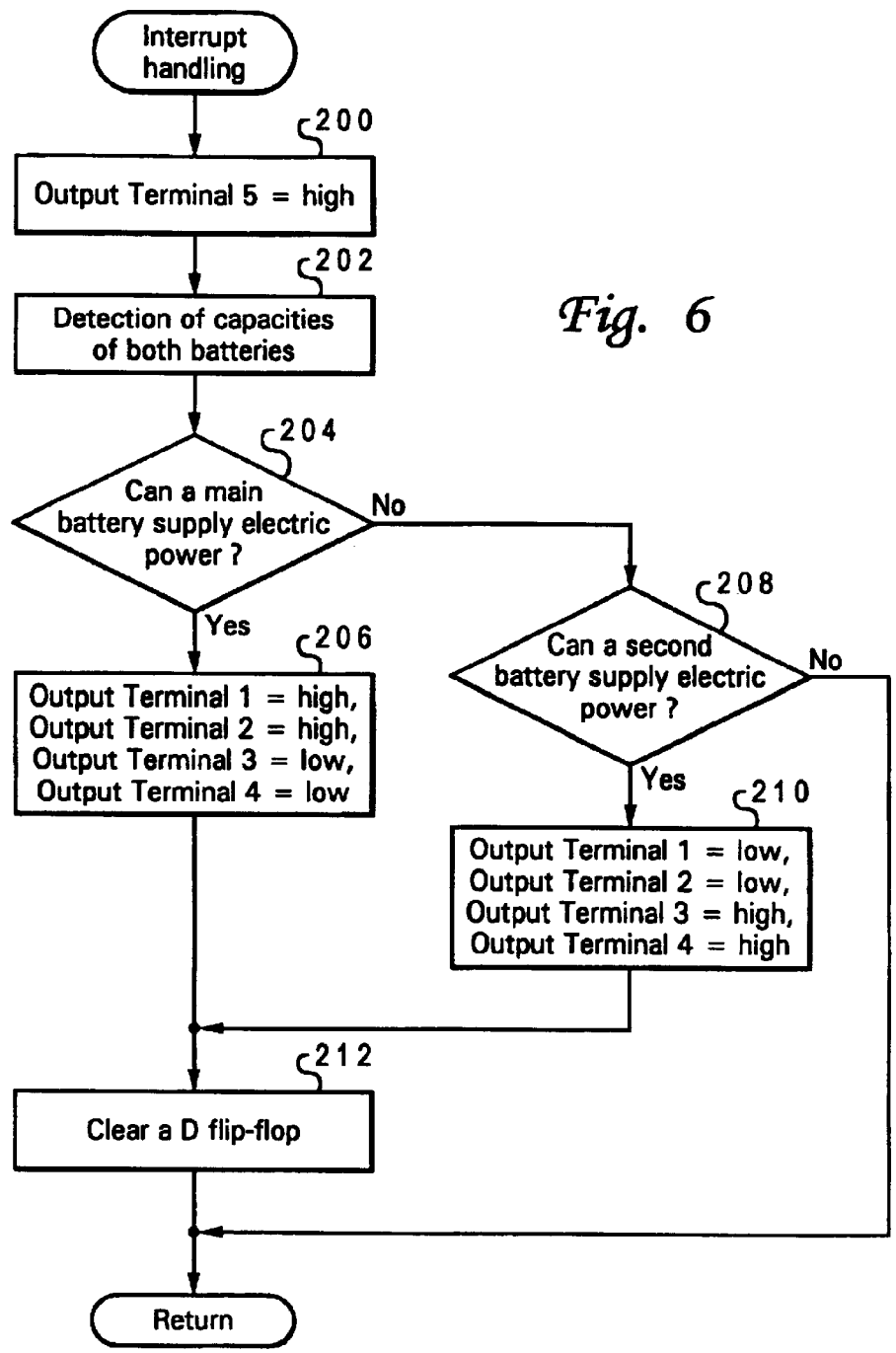
FIG. 6 is a flowchart showing the flow of interrupt handling that is executed by the PMC in the embodiment when the AC adapter is disconnected.

Now, with reference to FIG. 6, a description will be made of the operation of the PMC 82 in the case where the AC adapter 62 is disconnected from the PC 12 when either the main battery 64A or the second battery 64B is being trickle charged. FIG. 6 is a flowchart showing the flow of interrupt handling that is executed by the PCM 82 when the PCM 82 detects interception of electric power supplied through the AC adapter 62, i.e., when the #AC-ADAP signal input from the AC adapter detection circuit 110 changes from a low level to a high level.

In step 200 in the same figure, the output terminal 5 is made high, whereby the FET5 is made on. In step 202, the capacities of the main battery 64A and the second battery 64B are detected. In step 204, it is judged whether or not the capacity of the main battery 64A detected in step 202 is a capacity capable of supplying DC power to the DC-DC converter 66. If it can supply DC power, the interrupt handling advances to step 206, in which the output terminals 1, 2, 3, and 4 are made high, high, low, and low. Thereafter, the interrupt handling advances to step 212. As a method of detecting battery capacity, there is a method of directly obtaining a voltage across the battery with the PMC 82 (a battery voltage is input to the PMC 82 and converted to a digital signal in the inside of the PMC 82), or a method of performing communication between a battery pack and the PMC 82 and employing information representative of battery capacity or voltage sent from the battery pack.

If, in step 204, it is judged that it cannot supply, the interrupt handling advances to step 208. In step 208, it is judged whether or not the capacity of the second battery 64B detected in step 202 is a capacity capable of supplying DC power to the DC-DC converter 66. If supply is possible, the interrupt handling advances to step 210, in which the output terminals 1, 2, 3, and 4 are made low, low, high, and high. Thereafter, the interrupt handling advances to step 212.

In step 212 the D flip-flop 116 is cleared by making the #CLR signal low only for a predetermined period (corresponding to a period in FIG. 5 during which the #CLR signal is low). With this, the Q' output terminal of the D flip-flop 116 goes to a high level, and in the selector 118, the B input terminal is selected. Therefore, the states of the output terminals 1 through 4, set in the above-mentioned step 206 or 210, are input to the FET driving circuits corresponding to the FET1, the FET2, the FET3, and the FET4 through the selector 118. When the output terminals of the PCM 82 are set in step 206, the FET1 is switched on, the FET2 on, the FET3 off, and the FET4 off. When the output terminals of the PCM 82 are set in step 210, the FET1 is switched off, the FET2 off, the FET3 on, and the FET4 on.

With the above-mentioned interrupt handling in step 212, the ON-OFF control of the FET1, the FET2, the FET3, and the FET4 thereafter can be performed by the PMC 82.

If, in the above-mentioned step 208, it is judged that supply is not possible, DC power cannot be supplied to the PC 12 and therefore this interrupt handling ends without performing manipulation of the output terminals 1 through 4 and clearing of the D flip-flop 116.

Thus, in the above-mentioned interrupt handling, when the AC adapter 62 is disconnected of the PC 12, the battery capable of supplying DC power to the DC-DC converter 66 is connected to the DC-DC converter 66. That is, as described supra, the supply of DC power to the DC-DC converter 66 immediately after disconnection is performed by the operation performed when the AC adapter 62 is disconnected from the battery switching circuit 114. However, since the power-supply path at this time includes the body diodes of the FET1, the FET3, and the FET5, the problem of the generation of heat from the above-mentioned body diodes, a reduction in efficiency, etc., arises when power supply is continued in that state.

Hence, in this embodiment, power is supplied through the above-mentioned body diodes immediately after disconnection of the AC adapter 62, and thereafter, electric power is supplied without intervention of the body diodes by the above-mentioned interrupt handling that is performed by the PMC 82.

Figure 7:
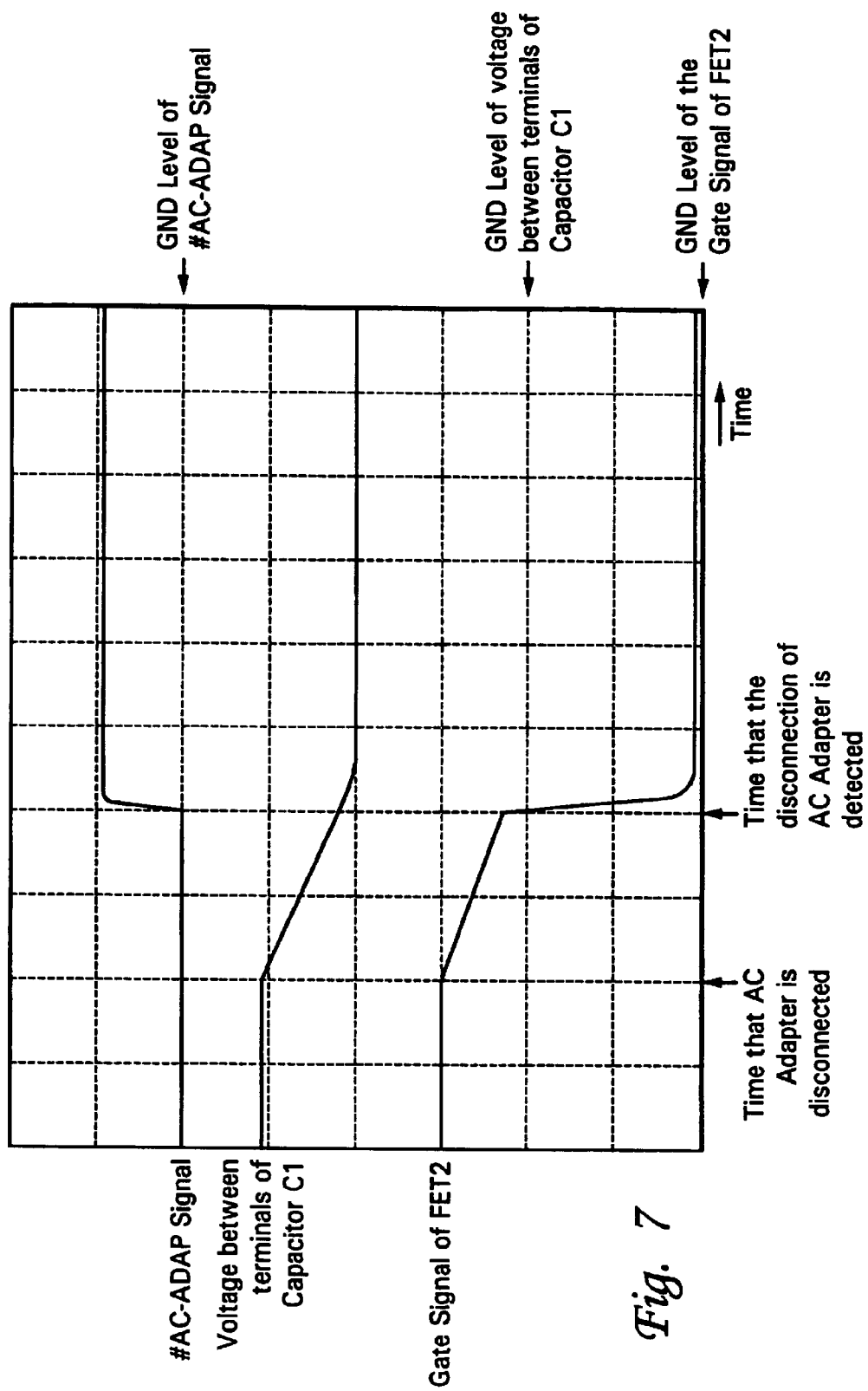
FIG. 7 is a waveform diagram used for explaining the advantages of the power-source switching circuit in the embodiment.
Figure 8:
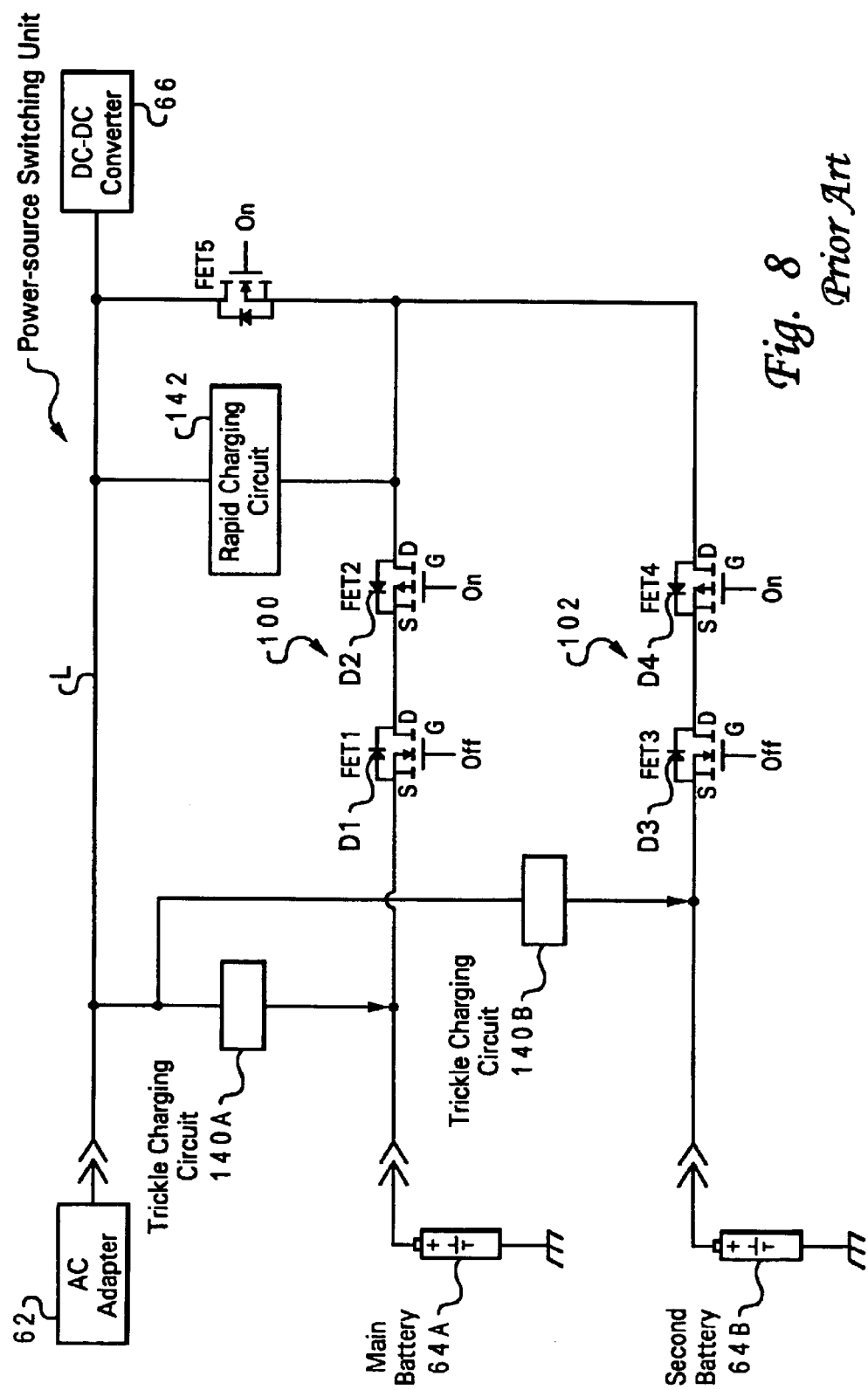
FIG. 8 is a block diagram showing a conventional power-source switching unit.
Figure 9:
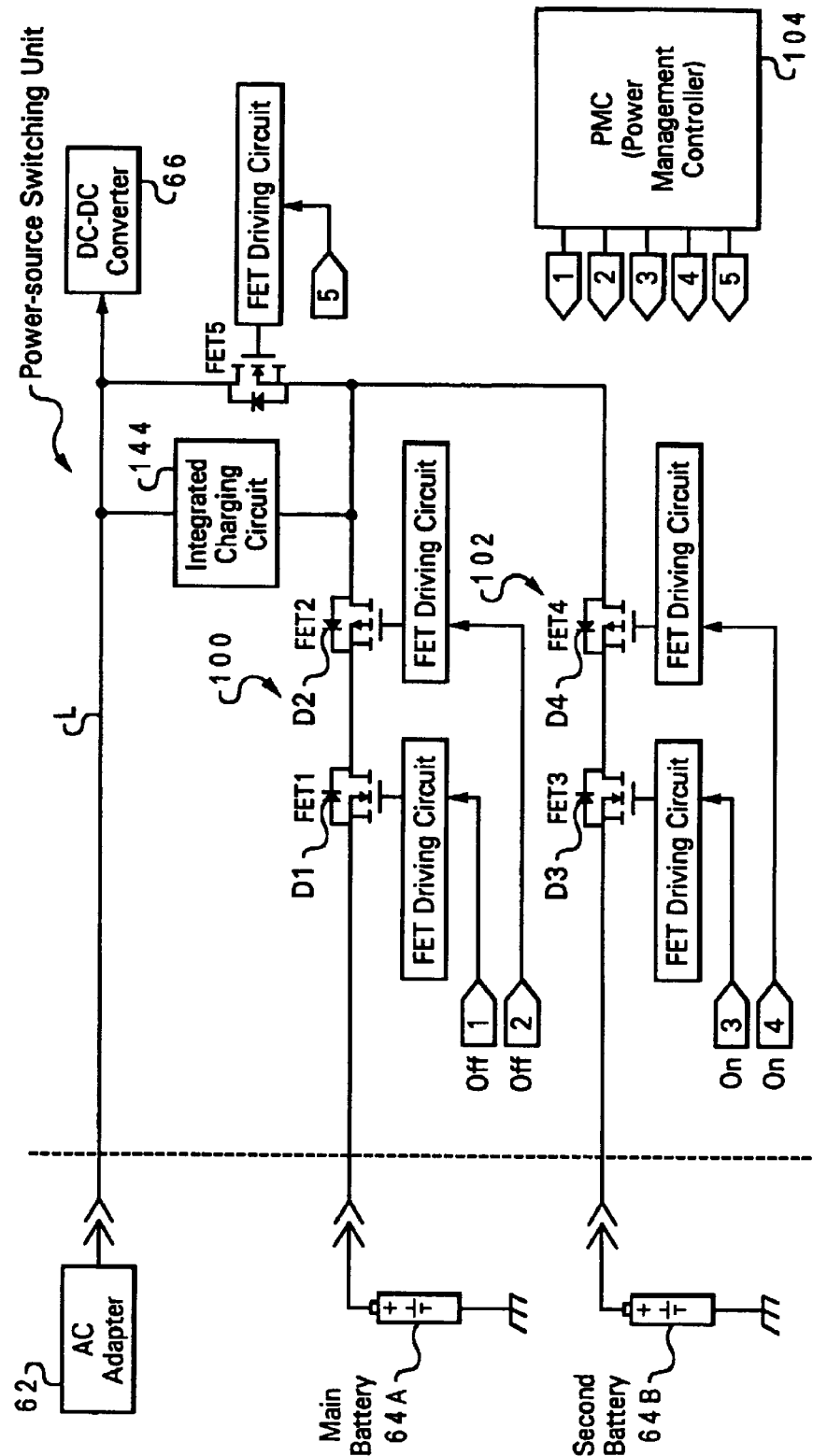
FIG. 9 is a block diagram showing a construction example in the case where the trickle charging circuit and the rapid charging circuit of the power-source switching unit of FIG. 8 are replaced with a single integrated charging circuit.
Figure 10:
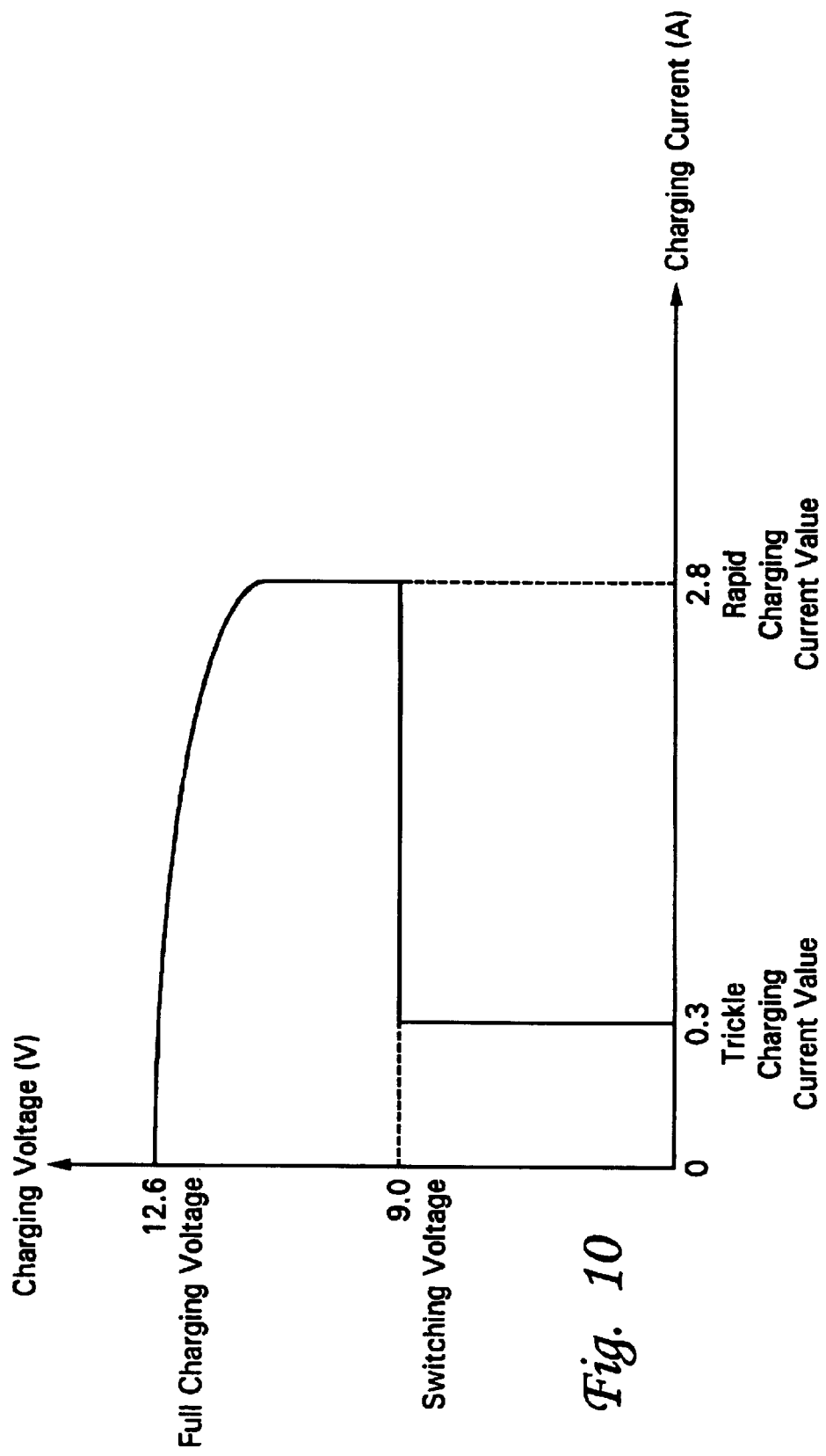
FIG. 10 is a graph showing an example of the charging characteristic of the integrated charging circuit.

FIG. 7 shows the result of measurements of the #AC-ADAP signal, the voltage between the terminals of the capacitor C1 constituting the temporary power-supply circuit 112, and the gate signal of the FET2 (signal input from the FET driving circuit to the gate G of the FET2) before and after disconnection of the AC adapter 62. In the same figure, 1 scale in the horizontal direction represents 50 mS and 1 scale in the vertical direction represents 5 V.

As shown in the same figure, there is a time difference of about 100 mS between the time that the AC adapter 62 is disconnected and the time that the disconnection is detected by the #AC-ADAP signal. However, since the voltage between the terminals of the capacitor C1 decreases gradually, the supply of DC power to the DC-DC converter 66 can be held for a period more than the above-mentioned time difference. Therefore, it is found that DC power can be continuously supplied to the PC 12 by making the FET1 off, the FET2 on, the FET3 off, and the FET4 on within the holding time by the battery switching circuit 114.

As has been described in detail hereinbefore, the power-source switching circuit according to this embodiment is provided with the AC adapter detection circuit 110 for detecting interception of electric power supplied from the outside through the AC adapter 62, and the temporary power-supply circuit 112 for supplying electric power only for a predetermined time when electric power supplied from the outside through the AC adapter 62 is intercepted. In addition, when the AC adapter 62 is disconnected from the PC 12 in charging either the main battery 64A or the second battery 64B, i.e., when supply of electric power supplied from the outside through the AC adapter 62 is intercepted, electric power can be continuously supplied to the PC 12, because all the batteries are connected to the PC 12 within the above-mentioned predetermined time.

While it has been described in this embodiment that the capacitor C1 is applied as the temporary power-supply circuit 112, the present invention is not limited to this. For example, other batteries having the same construction as the main and second batteries 64A, 64B can be applied.

While it has been described in this embodiment that when supply of electric power supplied from the outside is intercepted, the main battery 64A and the second battery 64B, charged with electric power supplied from the outside, are connected to the DC-DC converter 66, the present invention is not limited to this. For example, a fixed battery is equipped separately from the main battery 64A and the second battery 64B, and the fixed battery can be connected to the DC-DC converter 66. In this manner, even if the main battery 64A and the second battery 64B are both discharged, the supply of power to the computer can be continued with reliability. The fixed battery in this case corresponds to the fixed battery of the present invention.

While it has been described in this embodiment that electric power supplied from the outside is intercepted by disconnection of the AC adapter 62 from the PC 12, the present invention is not limited to this. For example, in the case where cables for inputting electric power to the power-supply line L or the AC adapter 62 are broken, electric power supplied from the outside is also intercepted. The present invention, as with this embodiment, is applicable to such a case.

While it has been described in this embodiment that when the AC adapter 62 is disconnected, the FET5 is switched on through the FET driving circuit by the PMC 82, the present invention is not limited to this. For example, by connecting the output terminal of the AC adapter detection circuit 110 directly to the FET driving circuit connected to the FET5, the FET5 can be switched on by that FET driving circuit. In addition, by constructing the selector 118 of the battery switching circuit 114 with a 5-bit multiplexer and also holding the fifth A input terminal at a high level, and by connecting the fifth Y output terminal to the FET driving circuit corresponding to the FET5, the FET5 can be switched on by the hardware when the AC adapter 62 is disconnected. In this case, the FET5 can be switched on without intervention of the PMC 82, so the switching of the FET 5 can be performed at a higher speed, compared with this embodiment.

Although it has been described in this embodiment that two batteries, the main battery 64A and the second battery 64B, are applied as a plurality of batteries, the present invention is not limited to this. For instance, three or more batteries can be used.

Although it has been described in this embodiment that the circuit, made up of the D flip-flop and the selector, is employed as the switching means of the present invention, the present invention is not limited to this. For instance, any circuit can be employed if it can connect both the main battery 64A and the second battery 64B with the DC-DC converter 66 within a period during which the temporary power-supply circuit 112 holds the supplied electric power.

Although it has been described in this embodiment that when the AC adapter 62 is disconnected, the FET1 is switched off, the FET2 on, the FET3 off, and the FET4 on by the battery switching circuit 114, the present invention is not limited to this. It will be sufficient if the FET1, the FET2, the FET3, and the FET4 are in a state where both batteries are connected to the DC-DC converter 66. For example, the FET1, the FET2, the FET3, and the FET4 can all be switched on.

Although it has been described in this embodiment that the AC adapter detection circuit 110 is constructed so that the #AC-ADAP signal changes from a low level to a high level when the supply of power from the AC adapter 62 to the DC-DC converter 66 is intercepted, the present invention is not limited to this. For instance, the AC adapter detection circuit 110 may be constructed so that the #AC-ADAP signal changes from a high level to a low level when the supply of power from the AC adapter 62 to the DC-DC converter 66 is intercepted.

The present invention has many advantages. As has been described supra, in the power-source switching unit according to the present invention, in the case where external power supply is intercepted in charging at least one of a plurality of batteries, electric power is supplied from at least one battery to computer loads when electric power is being supplied to the computer loads by the temporary power-supply device. Therefore, the power-source switching unit according to the present invention has the following excellent advantages: it does not need to be separately equipped with both a trickle charging circuit and a rapid charging circuit; it is capable of cost reduction and size reduction; and it is capable of continuing the supply of electric power to computer loads even when external power supply is intercepted.

In addition, in the computer according to the present invention, in the case where external power supply is intercepted in charging at least one of a plurality of batteries, electric power is supplied from at least one battery to computer loads when electric power is being supplied to the computer loads by the temporary power-supply device. Therefore, the computer according to the present invention has the following excellent advantages: it does not need to be equipped with both a trickle charging circuit and a rapid charging circuit; it is capable of cost reduction and size reduction; it is capable of continuing the supply of electric power to computer loads even when external power supply is intercepted; and shutdown resulting from the interception of external power supply can be avoided.

What is claimed is:

1. A power source switching unit with an integrated charging circuit for selectively coupling an external power source, a computer loads and one or more batteries, for providing temporary power during coupling, and for charging the one or more batteries, comprising:

an external power receiving unit to transfer-electric power from an external power source to a power output to which a computer load is coupled;

a detector, directly coupled to the power output of the external power receiving unit, to measure the voltage supplied by the external power receiving unit and detect a loss of the electric power supplied from the external power source to the external power receiving unit, wherein said detector detects the loss of the electric power supplied from the external power source to the external power receiving unit by measuring the voltage level supplied by the power output and comparing the voltage level to a fixed reference voltage, regardless of whether power is being supplied by the one or more batteries;

one or more battery power supply circuits to selectively couple one or more batteries to the computer loads and the one more batteries to an integrated charging device;

the integrated charging device, coupled to the power output and to the one or more battery supply circuits, wherein the charging device is capable of selectively trickle charging and rapid charging the one or more batteries with the electric power supplied from the power output;

a control unit to selectively cause the one or more battery supply circuits to couple the one or more batteries to the integrated charging unit during periods when the external power receiving unit is receiving electric power and to cause the one or more battery supply circuits to couple the one or more batteries to the computer load within a predetermined time in response to detector detecting a loss of the electric power supplied from the external power circuit; and a rechargeable temporary power supply device to supply electric power to the computer load for at least the predetermined time in response to the detector detecting the loss of the electric power supplied from the external power circuit.

2. The power source switching unit of claim 1, wherein the rechargeable temporary power supply device further comprises a capacitor coupled to the power output and the computer load.

3. The power source switching unit of claim 1, wherein the external power receiving unit is removably coupled to the computer loads.

4. The power source switching unit of claim 1, wherein the rechargeable temporary power device further comprises a rechargeable battery.

5. The power source switching unit of claim 1, wherein the external power receiving unit is supplied with alternating current electric power and discharges direct current electric power through the power output.

6. The power source switching unit of claim 1, further comprising a switching unit coupled to the power output and to one or more of the battery-power supply circuits, wherein the switching unit prevents a short circuit of the integrated charging device while the integrated charging device is charging one or more of the batteries.

7. The power source switching unit of claim 1, further comprising a direct current to direct current voltage converter coupled between the power output and the computer load.

8. A method of using a power source switching unit with an integrated charging circuit to selectively couple an external power source, a computer and one or more batteries, to provide temporary power during coupling, and to charge the one or more batteries, comprising:

an external power receiving unit transferring electric power from an external power source to a power output to which a computer load is coupled;

a detector, directly coupled to the power output of the external power receiving unit, measuring the voltage supplied by the external power receiving unit and detecting a loss of the electric power supplied from the external power source to the external power receiving unit, wherein said detector detects the loss of the electric power supplied from the external power source to the external power receiving unit by measuring the voltage level supplied by the power output and comparing the voltage level to a fixed reference voltage, regardless of whether power is being supplied by the one or more batteries;

one or more battery power supply circuits selectively coupling one or more batteries to the computer load and the one more batteries to an integrated charging device;

the integrated charging device, coupled to the power output and to the one or more battery supply circuits, selectively trickle charging and rapid charging the one or more batteries with the electric power supplied from the power output;

a control unit selectively causing the one or more battery supply circuits to couple the one or more batteries to the integrated charging unit during periods when the external power receiving unit is receiving electric power and causing the one or more battery supply circuits to couple the one or more batteries to the computer load within a predetermined time in response to the detector detecting a loss of the electric power supplied from the external power circuit, and a rechargeable temporary power supply device supplying electric power to the computer load for at least the predetermined time in response to the detector detecting the loss of the electric power supplied from the external power circuit.

9. The method of claim 8, wherein the supplying step further comprises a capacitor coupled to the power output and the computer load supplying electric power to the computer load.

10. The method of claim 8, further comprising removably coupling the external power receiving unit to the computer load.

11. The method of claim 8, wherein the supplying step further comprises a rechargeable battery coupled to the power output and the computer load supplying electric power to the computer load.

12. The method of claim 8, wherein the transferring step further comprises an external power receiving unit receiving alternating current electric power and discharging direct current electric power through the power output.

13. The method of claim 8, further comprising a switching unit coupled to the power output and to one or more of the battery power supply circuits preventing a short circuit of the integrated charging device while the integrated charging device is charging one or more of the batteries.

14. The method of claim 8, further comprising a high-voltage direct current to low-voltage direct current voltage converter, coupled between the power output and the computer load, converting voltage.

15. A data processing system including a power source switching unit with an integrated charging circuit for selectively coupling an external power source, a computer load and one or more batteries, for providing temporary power during coupling, and for charging the one or more batteries, comprising:

an external power receiving unit to transfer electric power from an external power source to a power output to which a computer load is coupled;

a detector, directly coupled to the power output of the external power receiving unit, to measure the voltage supplied by the external power receiving unit and to detect a loss of the electric power supplied from the external power source to the external power receiving unit, wherein said detector detects the loss of the electric power supplied from the external power source to the external power receiving unit by measuring the voltage level supplied by the power output and comparing the voltage level to a fixed reference voltage, regardless of whether power is being supplied by the one or more batteries;

one or more battery power supply circuits to selectively couple one or more batteries to the computer load and the one more batteries to an integrated charging device;

the integrated charging device, coupled to the power output and to the one or more battery supply circuits, wherein the charging device is capable of selectively trickle charging and rapid charging the one or more batteries with the electric power supplied from the power output;

a control unit to selectively cause the one or more battery supply circuits to couple the one or more batteries to the integrated charging unit during periods when the external power receiving unit is receiving electric power and to cause the one or more battery supply circuits to couple the one or more batteries to the computer load within a predetermined time in response to detector detecting a loss of the electric power supplied from the external power circuit, and a rechargeable temporary power supply device to supply electric power to the computer load for at least the predetermined time in response to the detector detecting the loss of the electric power supplied from the external power circuit.

16. The data processing system of claim 15, wherein the rechargeable temporary power supply device further comprises a capacitor coupled to the power output and the computer load.

17. The data processing system of claim 15, wherein the external power receiving unit is removably coupled to the computer load.

18. The data processing system of claim 15, wherein the rechargeable temporary power device further comprises a rechargeable battery.

19. The data processing system of claim 15, wherein the external power receiving unit is supplied with alternating current electric power and discharges direct current electric power through the power output.

20. The data processing system of claim 15, further comprising a switching unit coupled to the power output and to one or more of the battery power supply circuits, wherein the switching unit prevents a short circuit of the integrated charging device while the integrated charging device is charging one or more of the batteries.

21. The data processing system of claim 15, further comprising a direct current to direct current voltage converter coupled between the power output and the computer load.

* * * * *